Nov. 11, 1941.                    O. N. BRYANT                    2,262,560
                        ELECTROHYDRAULIC GOVERNOR APPARATUS
                            Filed Oct. 19, 1940          2 Sheets-Sheet 1
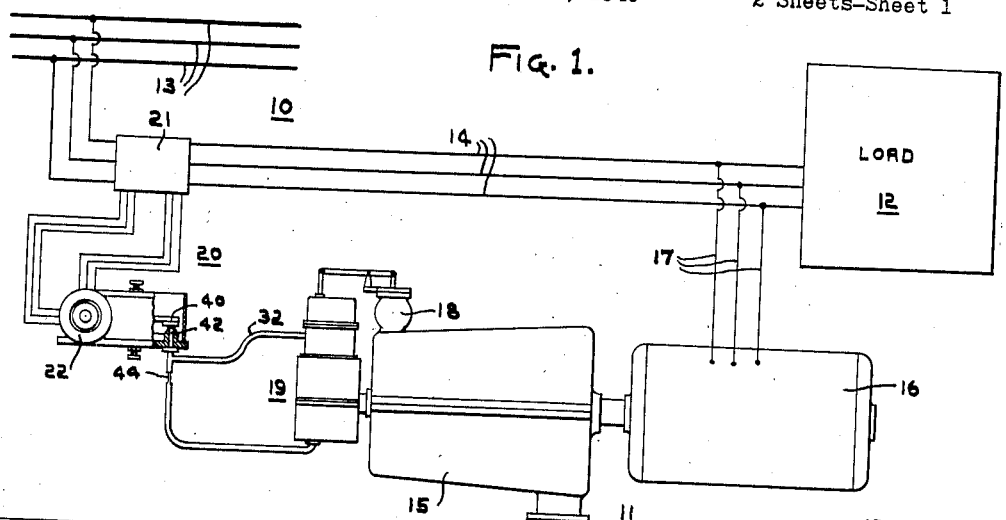
Fig. 1.
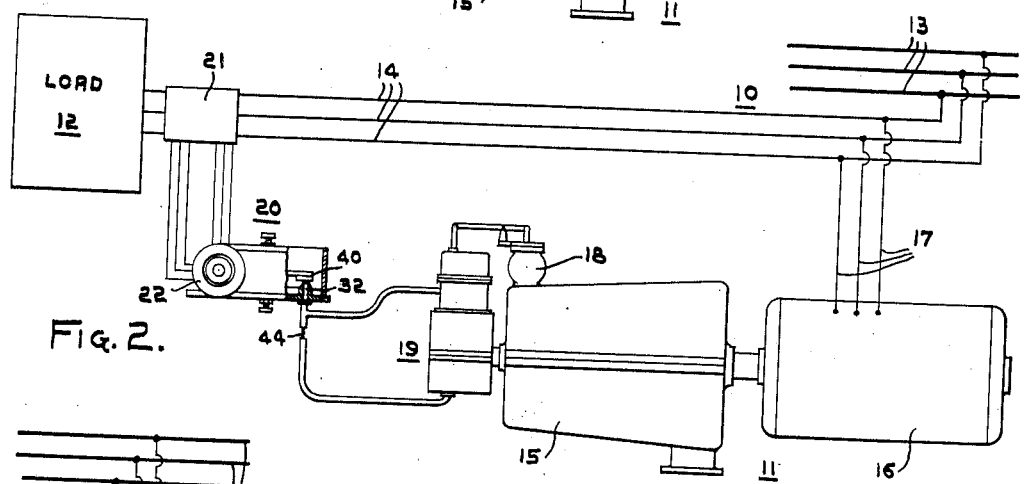
Fig. 2.
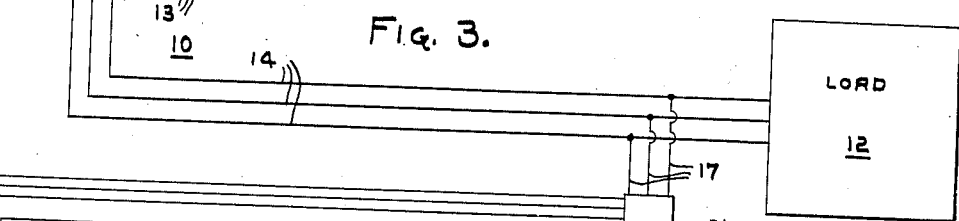
Fig. 3.
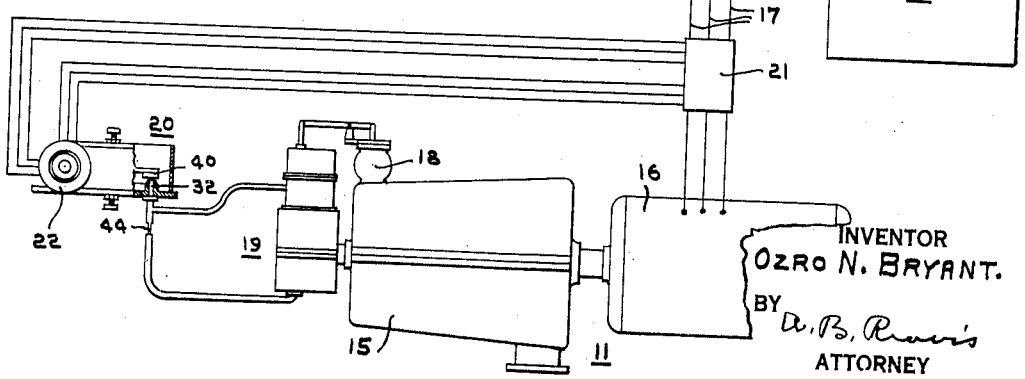
INVENTOR
Ozro N. Bryant.
BY
ATTORNEY

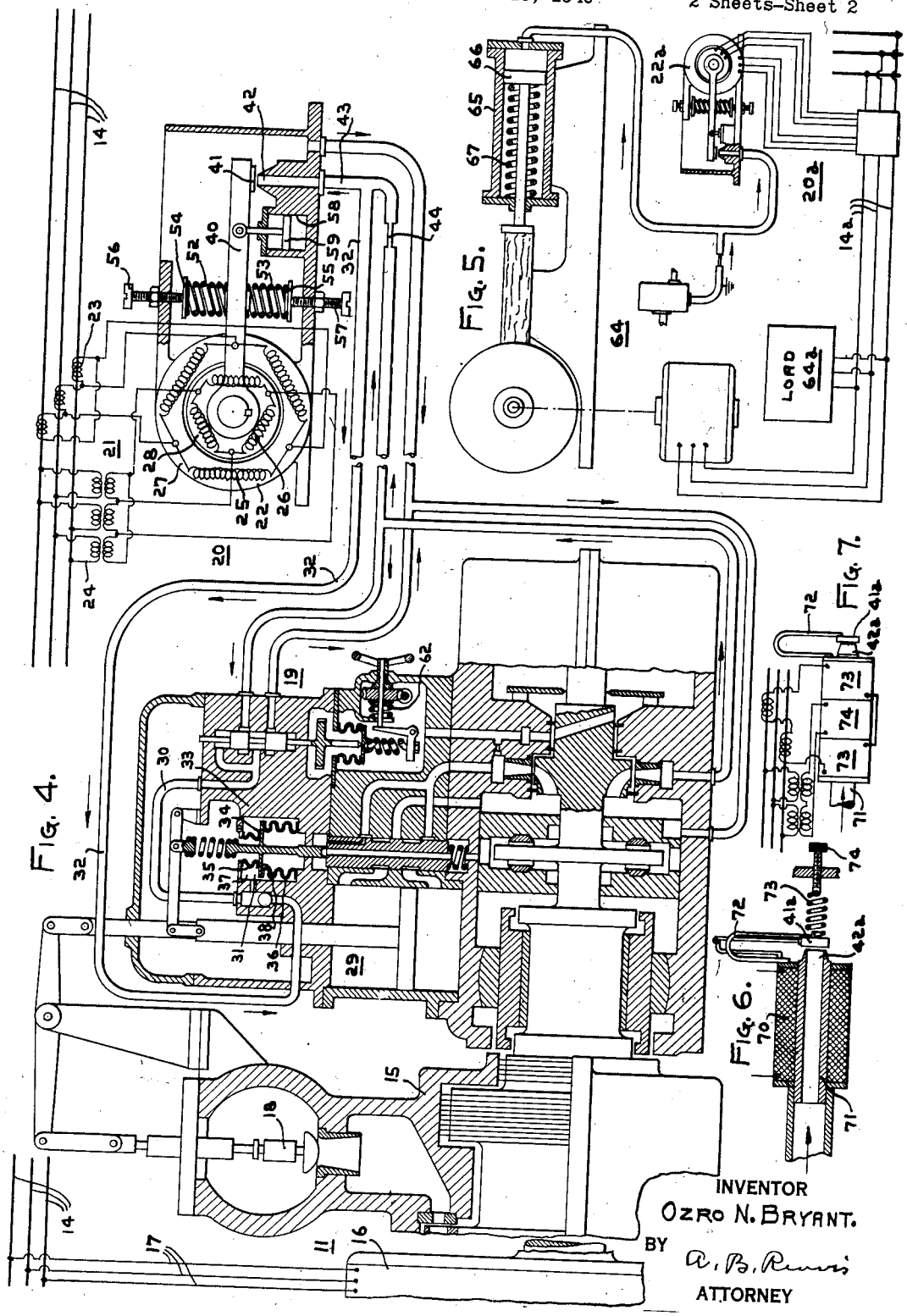

Patented Nov. 11, 1941

2,262,560

UNITED STATES PATENT OFFICE 2,262,560

ELECTROHYDRAULIC GOVERNOR APPARATUS

Ozro N. Bryant, Prospect Park, Pa., assignor to Westinghouse Electric & Manufacturing Company, East Pittsburgh, Pa., a corporation of Pennsylvania Application October 19, 1940, Serial No. 361,810

8 Claims. (Cl. 290—40)

This invention relates to an electrical power transmission system together with apparatus connected to said system, and it has for an object to provide controlling means for the apparatus operable in response to variations in a controlling fluid pressure, the controlling fluid pressure being varied by means of a power responsive device connected to a desired point in the electrical power transmission system.

A further object of the invention is to provide an electrical power transmission system having a generator connected thereto and driven by a prime mover having a governing system together with means responsive to an electrical load condition in the system at a desired point for quickly actuating or modifying the governing system in order to vary the admission of motive fluid or power input to the turbine.

Heretofore electric load-responsive relays have been used to actuate or modify the operation of governing systems in response to generator load, to total plant load, or to tie line load between two systems. Ordinarily, the turbine power input is changed by actuating the speed-changer motor of the governor. For many applications, where nearly instantaneous action is highly desirable, this method is far too slow to be satisfactory. The relay constituting the principal feature of the present invention gives very quick response and it is particularly useful with hydraulic governing systems for turbines of turbo-generators connected to electrical systems. Accordingly, it is a more particular object of the invention to provide a relay having a very quick response and which is peculiarly suitable for hydraulic control systems.

In some cases where machinery is driven from an electrical power transmission system, it may be desirable to have the operation of the machinery controlled in response to a power condition at a predetermined point in the system. For example, with a paper mill, if the total load tends to diminish, then to keep the load substantially constant, the additional power required for this purpose may be utilized in the pulp-grinding or similar machinery. The same is true with respect to pumps incorporated in a plant and which may be operated during off-peak periods in proportion to the extent that the power required for purposes other than pumping is diminished. In these and like situations, the machinery used to absorb the excess power to keep the power demand substantially constant is subject to control by my improved control apparatus, the apparatus being responsive to the power condition at a predetermined point in the system and developing a pressure which is exerted on a suitable part of the apparatus in order to render the latter effective to utilize excess available power.

These and other objects are effected by the invention as will be apparent from the following description and claims taken in connection with the accompanying drawings, forming a part of this application, in which:

Figs. 1, 2, and 3 are diagrammatic views showing the improved control apparatus applied to a turbo-generator connected to an electrical power transmission system;

Fig. 4 is a sectional view of a turbo-generator having the improved control apparatus associated therewith and connected to an electrical supply system to which the generator is also connected;

Fig. 5 is a diagrammatic view showing the improved control apparatus applied to a compensating power-consuming device operating to keep the power demand substantially constant; and Figs. 6 and 7 are detail views showing modified forms of power-responsive devices.

In Figs. 1 to 4, inclusive, the apparatus is shown as connected to the electrical power transmission system, at 10, comprising a turbo-generator, at 11, and a power-consuming mill or plant, at 12. The power transmission system, at 10, includes a main transmission line 13 and a local or plant line 14 connected thereto, and the turbo-generator includes a turbine 15 driving a generator 16 connected by leads 17 to the branch or local line 14.

The turbine 15 has an admission valve 18 which is controlled both by the speed responsive governor, at 19, and by the load responsive or wattmeter device, at 20. Where alternating current is transmitted and generated, the wattmeter device preferably comprises a transformer 21 connected to a torque motor 22, the transformer including current and potential transformers 23 and 24 connected, respectively, to the windings 25 and 26 of the stator and rotor 27 and 28 of the torque motor. If the wattmeter device is controlled by direct current, it is merely necessary to connect the windings with the control circuit with the windings arranged in series or parallel. The wattmeter device, through its torque motor, operates to provide a force dependent upon the power at the location of the transformer 21 and which is effective to control the supply of motive fluid to the turbine.

The wattmeter device, at 20, may be employed in several ways in connection with the local plant or mill, at 12, and its turbo-generator, at 11.

In Fig. 1, the transformer 21 of the wattmeter device is connected to the branch line 14 between the junction thereof with the main line and its junction with the leads 17 of the generator so as to hold the incoming power supplied from the main line 13 to the plant, at 12, substantially constant, variations in power demand being cared for by the turbo-generator, at 11.

In Fig. 2, the transformer 21 is connected in the line 14 between the plant, at 12, and the connection of such line with the generator and leads 17; and, in Fig. 3, the transformer 21 is included in the generator leads.

Referring now more in detail to the governor, at 19, and to the wattmeter device, at 20, in order that effects thereof in controlling the admission of steam to the turbine may be better understood, in Fig. 4, the admission valve 18 is operated by means of a servo-motor, at 29, under control of both the governor and of the wattmeter device, the governor preferably being of the hydraulic type and furnishing fluid under pressure by means of the conduit 30 to the pressure-responsive control device, at 31, for the servo-motor and the wattmeter device providing a controlling fluid pressure supplied by the conduit 32 to such device.

The pressure-responsive device, at 31, preferably includes a suitable housing 33 with a pressure abutment 34 therein and connected thereto by the upper and lower bellows elements 35 and 36 so as to define the pressure chamber 37. As shown, the upper bellows element is of smaller diameter than the lower one so that the abutment 34 presents an upwardly-facing annular pressure area 38 to the pressure chamber 37. Fluid under governing pressure supplied to the pressure chamber 37 serves to control operation of the servo-motor to adjust the admission valve suitably to the load.

Referring to the wattmeter device, at 20, a change in the voltage or current or both at the point of connection of its transformer 21 results in change in torque developed by the torque motor 22, the latter having a crank or torque arm 40 connected to the rotor and having a member 41 in covering relation with respect to the escape port 42 of an enclosed space 43 having fluid supplied thereto from a suitable pressure source by means of an orifice 44. The pressure maintained in the enclosed space will, therefore, depend upon the position of the covering member 41 with respect to the discharge end of the escape port 42, such covering member defining, with the discharge end of such escape port, an annular escape orifice. If the escape orifice is increased in flow area by upward movement of the covering member 41, then the fluid pressure in the enclosed space decreases and vice versa.

The enclosed space 43 includes the conduit 32 for connection to the pressure chamber 37 so that the controlling pressure furnished by the wattmeter device may be used to exert a controlling effect on the turbine.

Continuing with the description of the torque motor 22, upper and lower springs 52 and 53 have their adjacent ends bearing against opposite sides of the crank arm 40 and the outer ends thereof are engaged by abutments 54 and 55 adjustable by means of screws 56 and 57, respectively.

Means is provided for damping movements of the crank arm 40, such means preferably comprising a dashpot including the cylinder 58 and the piston 59 therein, the piston being connected to the arm 40.

When alternating current and voltage are supplied by the transformer to the torque motor, the rotor tends to rotate toward the closed position of the relay valve formed by the covering member 41 and the discharge end of the port 42. This tends to raise the controlling pressure maintained in the space 43, which pressure tends to open the relay. Consequently, for each increment of torque from the wattmeter, there is a corresponding counter torque from the relay. The biasing springs 52 and 53 permit any amount of electrical torque to be balanced out so that the fluid pressure torque range may be raised or lowered. Expressed algebraically, the electric torque + the spring torque + the relay torque = zero.

By making the area of the relay valve small, it becomes possible to obtain a considerable range of fluid pressure variation for a small change in watts input to the torque motor. The spring loads may be controlled by any suitable means, for example, by means of the manually-operable elements carried by the screws 56 and 57.

While the biasing springs and the electrical input are shown as being arranged to reduce the fluid pressure when the watts input increases, it will be obvious that the fluid pressure may be increased under the same conditions either by reversal of the electrical connections or by having the relay oppositely disposed in relation to movement of the torque motor.

From the apparatus so far described, it will be apparent that, as long as the governing or transformed pressure is larger than the wattmeter pressure, the turbo-generator will be entirely under the control of the transformer governor; however, just as soon as the wattmeter pressure supplied to the conduit 32 exceeds the transformed pressure supplied to the conduit 31, the wattmeter pressure is supplied to the pressure chamber 37 with the result that it takes control of the servo-motor to control the admission valve, such pressure causing operation of the servo-motor to move the admission valve in closing direction to an extent dependent upon the increase in pressure in the passage 32 over that in the passage 30. As the pressure in the passage 32 depends upon the electrical load at the point where the transformer 21 is connected, the extent of change of pressure in such passage will depend upon the extent of change of the power where the transformer is connected.

By suitable design, construction, and adjustment of the hydraulic relay apparatus operated by the torque motor, it is possible to maintain control of the turbine with a very narrow range of power variation in the line to which the transformer is connected. For example, in Fig. 1, where the watt-meter apparatus serves to minimize variations in electrical power supplied from the line 13 to the plant or mill, at 12, if the plant or mill load changes, then, only a small part of such change is imposed on the main line 13, the major part of the change in power demand being met by the turbo-generator at 11.

Where the arrangement is connected as shown in Fig. 2, the wattmeter apparatus controls the turbine so that its output satisfies variations in mill or plant demand to avoid imposing load variations on the main line 13.

In Fig. 3, the wattmeter control apparatus, at 20, is responsive to the power in the leads 17 so that the turbo-generator is controlled to maintain its power substantially constant.

The extent of control of the turbo-generator, at 11, by the wattmeter apparatus, at 20, depends upon adjustment of the governor speed changer, at 62. If the speed changer is adjusted for full load of the turbine, then control of the turbine for its full load range will be under the wattmeter device assuming that the turbine speed is normal. On the other hand, if the speed changer is set for fractional load of the turbo-generator, then the wattmeter device will operate to control the latter up to the load setting and then the governor will take control.

In Fig. 5, instead of the wattmeter control apparatus being effective to control the admission of motive fluid to the turbine, it is effective to vary the load of at least a part of the power consuming apparatus of a plant or mill to compensate for variations in power demand of the other power-consuming parts so that the total power input to the mill or plant may be kept substantially constant. To this end, as shown in Fig. 5, the plant or mill may be a paper mill including pulp grinding apparatus, at 64, which may be loaded in a variable manner, and other apparatus, at 64a. For example, by increasing the pressure with which wood is caused to engage a grinding member, the power consumed may be increased and vice versa. Accordingly, therefore, the wattmeter device, at 20a, has its transformer connected to the plant supply line 14a and has its torque motor 22a providing a variable pressure for the cylinder 65 having therein the ram piston 66 and the spring 67, the spring and fluid pressure acting on the piston determining the grinding pressure. If the total plant load demand should change, then, in order that the power supplied may be kept within a narrow range of variation, the power consumption of the grinder is varied. Thus, the grinding apparatus, or its equivalent, is used to compensate for load changes in other apparatus of the plant, an increase in power demand by such other apparatus calling for a decrease in power consumption of the grinding apparatus and vice versa.

In Fig. 6, instead of the torque motor heretofore described, there is provided a winding, at 70, disposed about the hollow core 71, one end of the latter providing an escape opening or port 42a. The covering member 41a provides an armature for the core and it is supported by a hinge or spring support 72. Magnetic attraction exerted on the armature is resisted by a spring 73 adjusted by the screw 74.

If desired the winding, at 70, may be of the single type which would respond to current satisfactorily where the voltage is substantially constant.

The magnet may include current windings 73 and a voltage winding 74.

From the foregoing, it will be apparent that the fundamental factor of control is the use of electrical current transmitted for this purpose. If the voltage is held substantially constant, a controlling field depending upon current is adequate; and, of course, in all cases there is response in accordance with the the current.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. The combination with an alternating-current generator connected to an electrical system and driven by a prime mover having an admission valve controlled by a speed governor, of apparatus for developing a controlling fluid pressure for modifying the effect of the governor on the valve, said apparatus including a member movable in one direction to increase the controlling fluid pressure and movable in the other direction to decrease such pressure, a torque motor including a stator and a rotor with windings thereon, means including current and potential transformers for connecting the windings to the system at a desired point, a crank arm on the rotor and operatively connected to said member, a pair of springs having their inner ends abutting opposite sides of the crank arm to oppose rotor movement, adjustable abutments for the outer ends of the springs, and means connected to the arm for damping movements thereof and of the rotor in opposite directions.

2. The combination with a generator connected to an alternating-current system and driven by a prime mover having an admission valve controlled by a fluid governor, of apparatus for developing a controlling fluid pressure for modifying the effect of the governor on the valve, said apparatus comprising means providing a space for fluid under controlling pressure, an orifice for supplying fluid from a suitable pressure source to the space, means providing an escape orifice for said space, said escape orifice including a member which is movable to vary the controlling pressure, and a device connected to the system at a desired point and responsive to power transmitted at the latter to move said member.

3. The combination with a generator connected to an alternating-current system and driven by a prime mover having an admission valve controlled by a fluid governor, of apparatus for developing a controlling fluid pressure for modifying the effect of the governor on the valve, said apparatus comprising means providing a space for fluid under controlling pressure, an orifice for supplying fluid from a suitable pressure source to the space, means providing an escape orifice for said space, said escape orifice including a member which is movable to vary the controlling pressure, a torque motor including a stator and a rotor with windings thereon, means providing for connection of said rotor to said member, means including current and potential transformers for connecting the windings to the system at a desired point, spring means for resisting movements of the rotor in opposite directions, means for adjusting the spring means, and means for damping rotor movements.

4. The combination with an electrical power transmission system, of apparatus connected to said system, pressure-responsive means for controlling the apparatus, means providing a fluid pressure space for fluid under controlling pressure and operatively associated with the pressure-responsive means, an orifice for supplying fluid to said space from a source of suitable fluid pressure, means providing an escape orifice for said space, said escape orifice including a member which is movable to vary the controlling fluid pressure in said space, and a means responsive to the power condition at a predetermined point in said system and operatively connected to said member to move the latter.

5. The combination with an electrical power transmission system, of apparatus connected to said system, pressure-responsive means for controlling the apparatus, means providing a fluid pressure space for fluid under controlling pressure and operatively associated with the pressure-responsive means, an orifice for supplying fluid to said space from a source of suitable fluid pressure, means providing an escape orifice for said space, said escape orifice including a member which is movable to vary the controlling fluid pressure in said space, means including a torque motor for moving said member in opposite directions, the torque motor including a stator and a rotor each provided with windings connected to the system at a desired point, a pair of springs for opposing movements of the rotor in opposite directions, means for adjusting the force of each spring, and dashpot means effective to damp rotor movements in opposite directions.

6. In combination; an electric transmission line; a motor device including a stator and a rotor provided with windings, means for connecting the windings at a desired point in the line so that the rotor has torque exerted thereon dependent upon power transmitted in said line at the point of connection; and apparatus for transforming torque of said rotor into fluid pressure; said apparatus including means providing a space for controlling fluid pressure, an orifice for supplying fluid to said space from a source of suitable fluid pressure, and means providing an escape orifice for said space and including a member operated by the rotor to vary the orifice area.

7. In combination, an electric transmission line; a motor device including a stator and a rotor provided with windings; means for connecting the windings at a desired point in the line so that the rotor has torque exerted thereon dependent upon power transmitted by said line at the point of connection; spring means exerting torque on the rotor in opposition to electrical torque; and apparatus for transforming the resultant torque into fluid pressure; said apparatus including means providing a space for controlling fluid pressure, an orifice for supplying fluid to said space from a source of suitable fluid pressure, and means providing an escape orifice for said space and including a member operated by the rotor to vary the orifice area.

8. In combination, an electric transmission line, a motor device including a stator and a rotor provided with windings, means for connecting the windings at a desired point in the line so that the rotor has torque exerted thereon dependent upon power transmitted by said circuit at the point of connection, spring means for exerting torque on the rotor, a member moved by the rotor, means providing for development of fluid pressure dependent upon movement of the member, and means for damping movements of said member.

OZRO N. BRYANT.